Jan. 12, 1926.  1,569,205
A. L. SANDIN
IGNITION DISTRIBUTOR MOUNTING AND PUMP FOR OILING THE BEARINGS THEREOF
Filed March 19, 1925   2 Sheets-Sheet 1

Inventor
Arthur L. Sandin
By Watson E. Coleman
Attorney

Jan. 12, 1926.  1,569,205
A. L. SANDIN
IGNITION DISTRIBUTOR MOUNTING AND PUMP FOR OILING THE BEARINGS THEREOF
Filed March 19, 1925   2 Sheets-Sheet 2
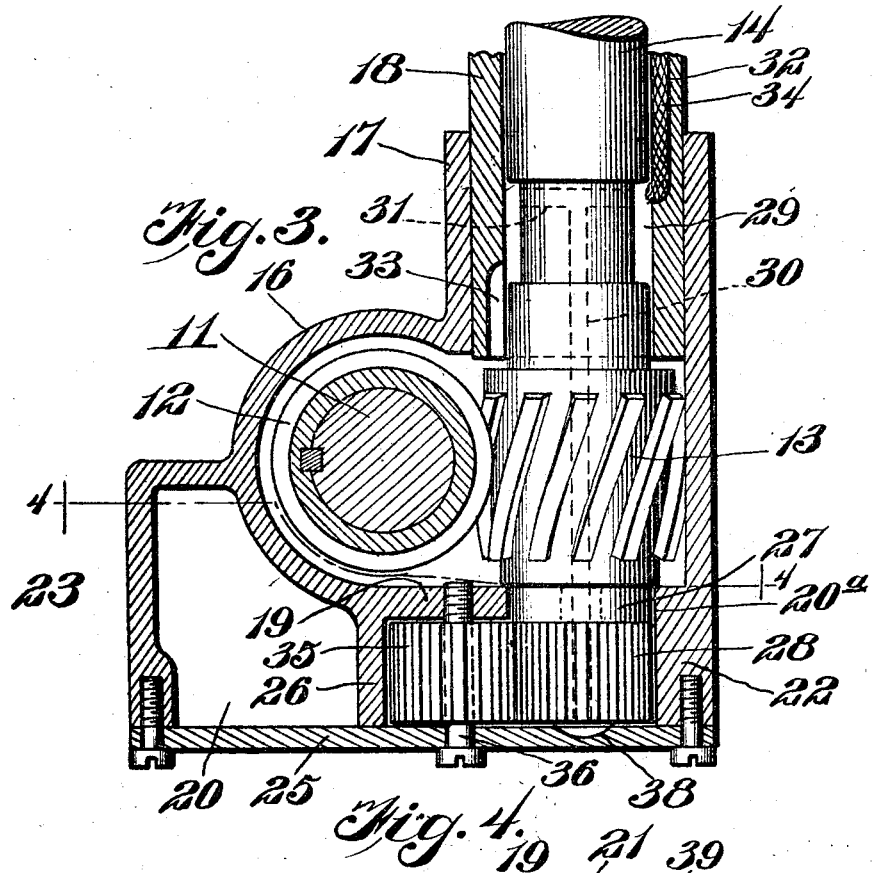
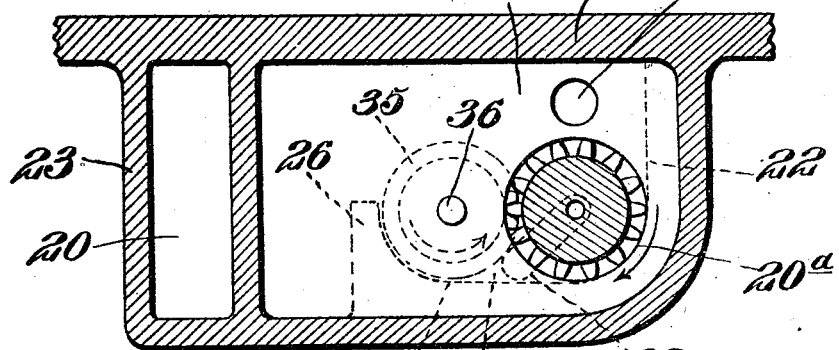
Inventor
Arthur L. Sandin
By Watson E. Coleman
Attorney Patented Jan. 12, 1926.

1,569,205

UNITED STATES PATENT OFFICE.

ARTHUR L. SANDIN, OF BISMARCK, NORTH DAKOTA, ASSIGNOR OF ONE-HALF TO LAHR MOTOR SALES COMPANY, OF BISMARCK, NORTH DAKOTA, A CORPORATION OF NORTH DAKOTA.

IGNITION DISTRIBUTOR MOUNTING AND PUMP FOR OILING THE BEARINGS THEREOF.

Application filed March 19, 1925. Serial No. 16,783.

*To all whom it may concern:*

Be it known that I, ARTHUR L. SANDIN, a citizen of the United States, residing at Bismarck, in the county of Burleigh and State of North Dakota, have invented certain new and useful Improvements in Ignition Distributor Mountings and Pumps for Oiling the Bearings Thereof, of which the following is a specification, reference being had to the accompanying drawings.

This invention relates to an ignition distributor mounting and pump for oiling the bearings thereof and has for a particular object thereof the provision of a compact and convenient mechanism enabling the use of oil as a lubricant for the gears and bearings associated with the distributor drive.

It is well known to those familiar with the art that the ignition distributor in many types of internal combustion engines is driven directly from the generator associated with the engine. As a means of lubricating the gearing and the associated bearings, grease is employed for the reason that the gears driving the distributor shaft, one of which is carried by the generator shaft, are so arranged that if immersed in oil, this oil would seep through the end bearing of the generator shaft and come into engagement with the armature of the generator and very probably result in destruction thereof. Grease as a lubricant is deficient in that in cold weather, it has a tendency to stiffen and fail to flow properly and accordingly thus reach the bearings which finally, for want of lubricant, "freeze" with the result that the gears are stripped or other damage results, rendering the system inoperative. An important object of this invention is accordingly the provision of means for continually supplying oil to such gears and bearings without immersing the gears in oil.

A still further object of the invention is to provide a device of this character such that it may be readily applied to standard makes of generator without altering the present construction thereof.

A still further and more specific object of the invention is to provide beneath this drive gearing an oil well into which the lower end of the distributor shaft projects, this lower end being formed with one member of a gear pump operating within the oil to drive the oil to the bearings and gears.

A still further object of the invention is to provide a construction permitting use of the distributor shaft as a conduit for the distribution of oil.

These and other objects I attain by the construction shown in the accompanying drawings, wherein for the purpose of illustration is shown a preferred embodiment of my invention and wherein:—

Figure 3 is a vertical sectional view through the mountings; and

Figure 4 is a section on the line 4—4 of Figure 3.

Figure 1:
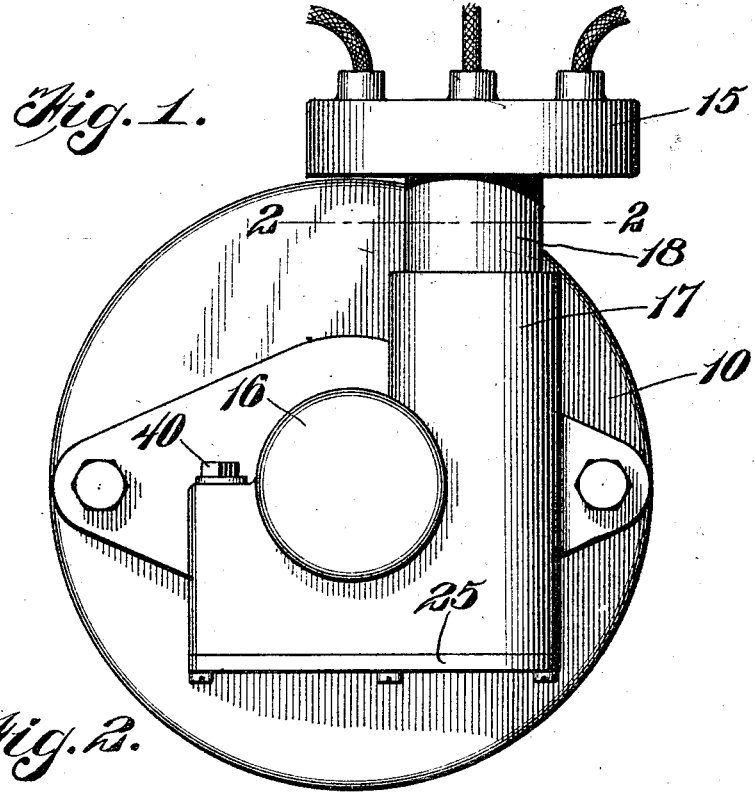
Figure 1 is a front elevation showing an ignition distributor mounting constructed in accordance with my invention applied to a generator.
Figure 2:
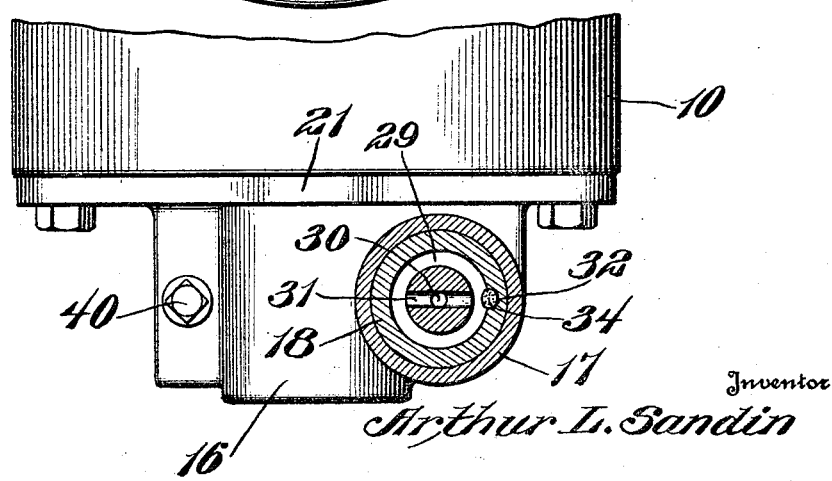
Figure 2 is a section on the line 2—2 of Figure 1.

Referring now more particularly to the drawings, the numeral 10 generally indicates the front end of a generator frame and 11 the generator shaft projecting through the front end of the frame and provided with a worm 12 which is adapted to mesh with a worm gear 13 carried by a distributor shaft 14 upon the upper end of which is mounted the usual distributor, generally indicated at 15, and which may be of any suitable character.

In accordance with my invention, I provide a casting having a horizontally directed tubular section 16 adapted to receive and house the generator shaft and its worm and a vertical tubular portion 17 receiving the lower end of the distributor shaft housing 18 and the worm gear 13 which meshes with the worm 12. The lower end of the tubular housing 17 is defined by a horizontal wall 19 tangential to the tubular housing 16 and forming at this point, the upper wall of an oil reservoir 20. This oil reservoir is formed with a rear vertical wall 21, side vertical walls 22, 23, and an outer end wall 24. A removable bottom 25 is provided for this reservoir. From the front vertical wall, a baffle wall 26 projects rearwardly for a purpose presently to appear.

The upper wall 19 of the oil reservoir is provided with an opening 20ª which is co-axial with the tubular housing 17. The distributor shaft 14, instead of being terminated as is usual at the worm gear 13, projects below this worm gear having a portion of the same length as the thickness of the wall 19 which closely fits within the opening 20 and which is indicated at 27 and a further or lower end portion 28 which is formed to provide one gear or a gear pump. The lower end of this shaft rests upon the lower wall 25 of the oil reservoir 20. The shaft is further provided adjacent its upper end with a circumferential groove 29. This groove is in communication through the bottom of the shaft with the oil reservoir by a vertical port 30 and a transverse port 31 communicating with the upper end of the bore 30 and opening through the sides of the shaft at the groove. The distributor housing 18 is formed above and below the groove 29 of the shaft with vertically extending grooves 32, 33. The upper groove 32 has mounted therein a wick 34 for feeding oil from the groove 29 to the upper bearings of the distributor shaft and to the distributor proper. The groove 33 opens through that side of the distributor housing 18 engaged immediately above the coacting interdigitated portions of the worm and worm gear so that oil passing therethrough falls directly upon these faces.

Meshing with the pump gear 28 from the lower end of the distributor shaft is a second pump gear 35 held in position by a pivot 36 directed through the bottom plate 25 and threaded into the upper wall 19 of the reservoir. The rotation of the distributor shaft is in the direction of the arrow on Figure 3 and the gear 28 closely engages the side wall 22 and front wall 24 while the gear 35 closely engages the baffle wall 26 and front wall 24. By rotation of the gears in this direction, oil will be picked up from the reservoir and forced by the gears into the space 37 between the gears and the front wall 24. This space is in communication with the bore 30 of the distributor shaft by a groove 38 formed in the upper surface of the bottom plate 25 and having its outer end arranged within the space and its inner end arranged beneath the lower end of the shaft 14. Accordingly, as the distributor shaft is driven, oil will be continuously forced upwardly through the bore 30 into the groove 29. From this point, it will be fed to the bearings of the distributor shaft above and below this groove and will also be fed to the worm and gear 12 and 13. The upper wall 19 of the reservoir 20 is formed with a drain opening 39 permitting return of the oil from the tubular housings 16 and 17 to the reservoir. The contents of the reservoir may be replenished from time to time through a filling opening, generally designated at 40. It will be obvious that by this structure, an efficient lubrication both of the gears and bearings of the distributor drive will be had at all times and that since the pump is operating continuously in oil, the likelihood of failure of operation is substantially eliminated.

It will furthermore be obvious that a structure of this character may be readily substituted for the ordinary distributor mounting construction without altering the generator frame or going to any further expense than that involved in purchase of the assembly represented by the casting and the distributor shaft and its associated pump.

Since the structure is capable of a certain range of change and modification without materially departing from the spirit of my invention, I do not limit myself to such specific structure except as hereinafter claimed.

I claim:—

1. An ignition distributor mounting and means for oiling the same comprising in combination a distributor shaft having a worm gear and a generator shaft having a worm for coaction with the gear, a housing for the adjacent ends of said shafts adapted to be secured to the generator and providing beneath the generator shaft a reservoir, the lower end of the distributor shaft being projected into said reservoir and formed to provide one end of a gear pump, a second gear for the gear pump meshing with the gear of the distributor shaft to be driven thereby and a longitudinal port formed in the distributor shaft to provide an outlet from the gear pump and communicating with bearings of the distributor shaft, the bearings of the distributor shaft including upper and lower sections, the distributor shaft intermediate said sections having a groove into which said port discharges and a wick mounted in the bearing wall of the upper bearing and extending into said groove.

2. An ignition distributor mounting and means for oiling the same comprising in combination a distributor shaft having a worm gear and a generator shaft having a worm for coaction with the gear, a housing for the adjacent ends of said shafts adapted to be secured to the generator and providing beneath the generator shaft a reservoir, the lower end of the distributor shaft being projected into said reservoir and formed to provide one end of a gear pump, a second gear for the gear pump meshing with the gear of the distributor shaft to be driven thereby, a longitudinal port formed in the distributor shaft to provide an outlet from the gear pump and communicating with bearings of the distributor shaft, the bearings of the distributor shaft including upper and lower sections, the distributor shaft intermediate said sections having a groove into which said port discharges, and a wick mounted in the bearing wall of the upper bearing and extending into said groove, the wall of the lower bearing having a groove forming said means for conducting oil from the bearings to said worm and worm gear.

3. An ignition distributor mounting and means for oiling the same comprising in combination a distributor shaft having a worm gear and a generator shaft having a worm for coaction with the gear, a housing for the adjacent ends of said shafts adapted to be secured to the generator and providing beneath the generator shaft a reservoir, the lower end of the distributor shaft being projected into said reservoir and formed to provide one end of a gear pump, a second gear for the gear pump meshing with the gear of the distributor shaft to be driven thereby and a longitudinal port formed in the distributor shaft to provide an outlet from the gear pump and communicating with bearings of the distributor shaft, the lower end of the distributor shaft abutting the bottom of said reservoir, the bottom of said reservoir having a groove placing the longitudinal port thereof in communication with the pressure chamber of the gear pump.

4. An ignition distributor mounting and means for oiling the same comprising in combination a distributor shaft having a worm gear and a generator shaft having a worm for coaction with the gear, a housing for the adjacent ends of said shafts adapted to be secured to the generator and providing beneath the generator shaft a reservoir, the lower end of the distributor shaft being projected into said reservoir and formed to provide a gear, the lower end of which abuts the bottom wall of the reservoir, a second gear meshing with the first named gear, the walls of said reservoir combining with said gears to provide a pump having a pressure chamber, the lower wall of the reservoir having a groove placing the pressure chamber into communication with the longitudinal port formed in the distributor shaft.

5. An ignition distributor mounting and means for oiling the same comprising in combination a distributor shaft having a worm gear and a generator shaft having a worm for coaction with the gear, a housing for the adjacent ends of said shafts adapted to be secured to the generator and providing beneath the generator shaft a reservoir, the lower end of the distributor shaft being projected into said reservoir and formed to provide a gear, the lower end of which abuts the bottom wall of the reservoir, a second gear meshing with the first named gear, the walls of said reservoir combining with said gears to provide a pump having a pressure chamber, the lower wall of the reservoir having a groove placing the pressure chamber into communication with the longitudinal port formed in the distributor shaft, upper and lower bearings for said distributor shaft, a groove formed in the distributor shaft intermediate the bearings and a connection between said groove and said longitudinal port.

6. An ignition distributor mounting and means for oiling the same comprising in combination a distributor shaft having a worm gear and a generator shaft having a worm for coaction with the gear, a housing for the adjacent ends of said shafts adapted to be secured to the generator and providing beneath the generator shaft, a reservoir, the lower end of the distributor shaft being projected into said reservoir and formed to provide a gear, the lower end of which abuts the bottom wall of the reservoir, a second gear meshing with the first named gear, the walls of said reservoir combining with said gears to provide a pump having a pressure chamber, the lower wall of the reservoir having a groove placing the pressure chamber into communication with the longitudinal port formed in the distributor shaft, upper and lower bearings for said distributor shaft, a groove formed in the distributor shaft intermediate the bearings and a connection between said groove and said longitudinal port, the lower bearing having a longitudinally extending groove through which the oil may return and by which the oil is guided to said worm and worm gear.

7. An ignition distributor mounting and means for oiling the same comprising in combination a distributor shaft having a worm gear and a generator shaft having a worm for coaction with the gear, a housing for the adjacent ends of said shafts adapted to be secured to the generator and providing beneath the generator shaft a reservoir, the lower end of the distributor shaft being projected into said reservoir and formed to provide a gear, the lower end of which abuts the bottom wall of the reservoir, a second gear meshing with the first named gear, the walls of said reservoir combining with said gears to provide a pump having a pressure chamber, the lower wall of the reservoir having a groove placing the pressure chamber into communication with the longitudinal port formed in the distributor shaft, upper and lower bearings for said distributor shaft, a groove formed in the distributor shaft intermediate the bearings, a connection between said groove and said longitudinal port, the lower bearing having a longitudinally extending groove through which the oil may return and by which the oil is guided to said worm and worm gear, the upper bearing having a groove and a wick within said groove, the lower end of which projects into the groove of the shaft.

In testimony whereof I hereunto affix my signature.

ARTHUR L. SANDIN.